(12) United States Patent
Lee et al.

(10) Patent No.: US 9,633,785 B2
(45) Date of Patent: Apr. 25, 2017

(54) MULTILAYER CERAMIC ELECTRONIC COMPONENT AND BOARD HAVING THE SAME

(71) Applicant: SAMSUNG ELECTRO-MECHANICS CO., LTD., Suwon-Si, Gyeonggi-Do (KR)

(72) Inventors: Sun Cheol Lee, Suwon-Si (KR); Min Hyang Kim, Suwon-Si (KR); Seung Yul Lee, Suwon-Si (KR); Kyeong Jun Kim, Suwon-Si (KR); Jang Hyun Lee, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 99 days.

(21) Appl. No.: 14/662,201

(22) Filed: Mar. 18, 2015

(65) Prior Publication Data

US 2016/0099107 A1 Apr. 7, 2016

(30) Foreign Application Priority Data

Oct. 6, 2014 (KR) .......................... 10-2014-0134271

(51) Int. Cl.
*H01G 4/012* (2006.01)
*H01G 4/30* (2006.01)
(Continued)

(52) U.S. Cl.
CPC ............. *H01G 4/012* (2013.01); *H01G 2/065* (2013.01); *H01G 4/232* (2013.01); *H01G 4/30* (2013.01); *H01G 4/1227* (2013.01)

(58) Field of Classification Search
CPC  H01G 4/30; H01G 4/232; H01G 4/12; H01G 2/06; H01G 4/012; H01G 4/1227; H01G 2/065; H05K 1/181
See application file for complete search history.

(56) References Cited

U.S. PATENT DOCUMENTS 4,568,999 A * 2/1986 Larowe .................... H01G 2/06
361/306.3
6,292,353 B1 * 9/2001 Haratani ................ H01G 4/232
361/306.3
(Continued)

FOREIGN PATENT DOCUMENTS

JP 2000-012377 A 1/2000
JP 2009-071106 A 4/2009
(Continued)

*Primary Examiner* — David M Sinclair
(74) *Attorney, Agent, or Firm* — McDermott Will & Emery LLP

(57) ABSTRACT

A multilayer ceramic electronic component may includes: a ceramic body including dielectric layers; an active layer including first and second internal electrodes disposed to be exposed to both end surfaces of the ceramic body in a length direction of the ceramic body, respectively, first floating electrodes overlapping the first and second internal electrodes while being spaced apart from each other in the thickness direction of the ceramic body, second floating electrodes each disposed to be spaced apart from the first and second internal electrodes, and first and second dummy electrodes disposed to be spaced apart from the first floating electrodes; upper and lower cover layers disposed upwardly and downwardly of the active layer, respectively; third and fourth dummy electrodes disposed to be exposed to both end surfaces of the ceramic body in the length direction of the ceramic body, respectively; and fifth dummy electrodes.

16 Claims, 4 Drawing Sheets

(51) Int. Cl.
*H01G 2/06* (2006.01)
*H01G 4/12* (2006.01)
*H01G 4/232* (2006.01)

(56) References Cited

U.S. PATENT DOCUMENTS

| | | | | |
|---|---|---|---|---|
| 2007/0133147 A1* | 6/2007 | Ritter | ............... | H01G 4/232 |
| | | | | 361/306.3 |
| 2011/0122540 A1* | 5/2011 | Ogawa | ............ | H01G 4/2325 |
| | | | | 361/305 |
| 2012/0300361 A1* | 11/2012 | Togashi | ............ | H01G 4/30 |
| | | | | 361/301.4 |
| 2013/0342081 A1* | 12/2013 | Kuroda | ............ | H01C 7/008 |
| | | | | 310/366 |
| 2014/0293500 A1* | 10/2014 | Seo | ......... | H01G 4/12 |
| | | | | 361/301.4 |
| 2015/0179339 A1* | 6/2015 | Seo | ......... | H01G 4/12 |
| | | | | 361/301.4 |

FOREIGN PATENT DOCUMENTS

| | | | |
|---|---|---|---|
| JP | 2012253245 A | * | 12/2012 |
| JP | 2013-093374 A | | 5/2013 |
| JP | 2013093374 A | * | 5/2013 |

* cited by examiner

A-A'

MULTILAYER CERAMIC ELECTRONIC COMPONENT AND BOARD HAVING THE SAME

CROSS-REFERENCE TO RELATED APPLICATION

This application claims the priority and benefit of Korean Patent Application No. 10-2014-0134271 filed on Oct. 6, 2014, with the Korean Intellectual Property Office, the disclosure of which is incorporated herein by reference.

BACKGROUND

The present inventive concept relates to a multilayer ceramic electronic component and a board having the same.

A capacitor, an inductor, a piezoelectric element, a varistor, a thermistor, and the like, are representative electronic components formed using ceramic materials.

Among such ceramic electronic components, multilayer ceramic capacitors (MLCCs) have advantages thereof such as a small size, high capacitance, ease in the mounting thereof, and the like.

An MLCC is a chip-shaped condenser mounted on the printed circuit boards (PCBs) of various types of electronic products, such as image display devices including liquid crystal displays (LCDs), plasma display panels (PDPs), and the like, as well as computers, smartphones, cellular phones, and the like, serving to charge electricity therein as well as to discharge electricity therefrom.

Such a multilayer ceramic capacitor may include a plurality of stacked dielectric layers, internal electrodes having different polarities disposed to face each other with respective dielectric layers interposed therebetween, and external electrodes electrically connected to the internal electrodes.

Generally, in the case of a high capacitance multilayer ceramic capacitor, the desired capacitance value thereof may be satisfied by increasing or decreasing the number of stacked internal electrodes, but in the case of a low capacitance multilayer ceramic capacitor, the desired capacitance value thereof may be decreased by inserting a buffer layer having a predetermined thickness to increase a thickness of one of the layers constituting the dielectric layers.

In such a case, the internal electrode and the external electrode need to be electrically connected to each other in a stable manner, and the multilayer ceramic capacitor need to have sufficient bending strength in order to withstand stress generated at the time of manufacturing or mounting the multilayer ceramic capacitor.

RELATED ART DOCUMENT

Japanese Patent Laid-Open Publication No. 2009-71106

SUMMARY

An exemplary embodiment in the present disclosure may provide a multilayer ceramic electronic component capable of preventing the generation of cracks and delaminations by having high bending strength, and a board having the same.

According to an aspect of the present inventive concept, a multilayer ceramic electronic component may include: first and second internal electrodes disposed in a ceramic body to be exposed to both end surfaces of the ceramic body in a length direction of the ceramic body, respectively, first floating electrodes each having both end portions overlapping end portions of the respective first and second internal electrodes while being spaced apart from each other in a thickness direction of the ceramic body, second floating electrodes each disposed to be spaced apart from the first and second internal electrodes, and first and second dummy electrodes disposed to be spaced apart from the first floating electrodes and exposed to both end surfaces of the ceramic body in the length direction of the ceramic body, respectively; third and fourth dummy electrodes disposed to overlap the first and second dummy electrodes while being spaced apart from each other in the thickness direction of the ceramic body, respectively; and fifth dummy electrodes each disposed to be spaced apart from the third and fourth dummy electrodes and to overlap the first floating electrodes.

According to another aspect of the present inventive concept, a board having a multilayer ceramic electronic component may include a printed circuit board (PCB); first and second board electrodes disposed on a surface of the PCB; and the multilayer ceramic electronic component mounted on the PCB and electrically connected to the first and second board electrodes. The multilayer ceramic electronic component may include: first and second internal electrodes disposed in the ceramic body to be exposed to both end surfaces of a ceramic body in a length direction of a ceramic body, respectively, first floating electrodes each having both end portions overlapping end portions of the respective first and second internal electrodes while being spaced apart from each other in a thickness direction of the ceramic body, second floating electrodes each disposed to be spaced apart from the first and second internal electrodes, and first and second dummy electrodes disposed to be spaced apart from the first floating electrodes and exposed to both end surfaces of the ceramic body in the length direction of the ceramic body, respectively; third and fourth dummy electrodes disposed to overlap the first and second dummy electrodes while being spaced apart from each other in the thickness direction of the ceramic body, respectively; and fifth dummy electrodes each disposed to be spaced apart from the third and fourth dummy electrodes and to overlap the first floating electrodes.

BRIEF DESCRIPTION OF DRAWINGS

The above and other aspects, features and other advantages of the present inventive concept will be more clearly understood from the following detailed description taken in conjunction with the accompanying drawings, in which.

DETAILED DESCRIPTION

Figure 1:
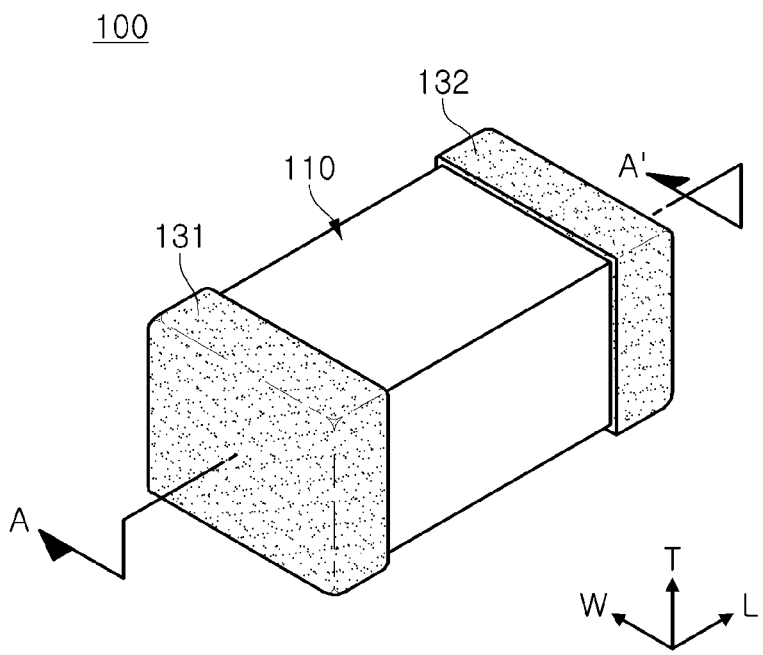
FIG. 1 is a perspective view of a multilayer ceramic electronic component according to an exemplary embodiment of the present inventive concept.

Exemplary embodiments of the present inventive concept will now be described in detail with reference to the accompanying drawings.

The inventive concept may, however, be exemplified in many different forms and should not be construed as being limited to the specific embodiments set forth herein. Rather, these embodiments are provided so that this disclosure will be thorough and complete, and will fully convey the scope of the inventive concept to those skilled in the art.

In the drawings, the shapes and dimensions of elements may be exaggerated for clarity, and the same reference numerals will be used throughout to designate the same or like elements.

In addition, describing in the present inventive concept, L, W, and T shown in FIG. 1 refer to a length direction, a width direction, and a thickness direction, respectively.

Multilayer Ceramic Electronic Component

Figure 2:
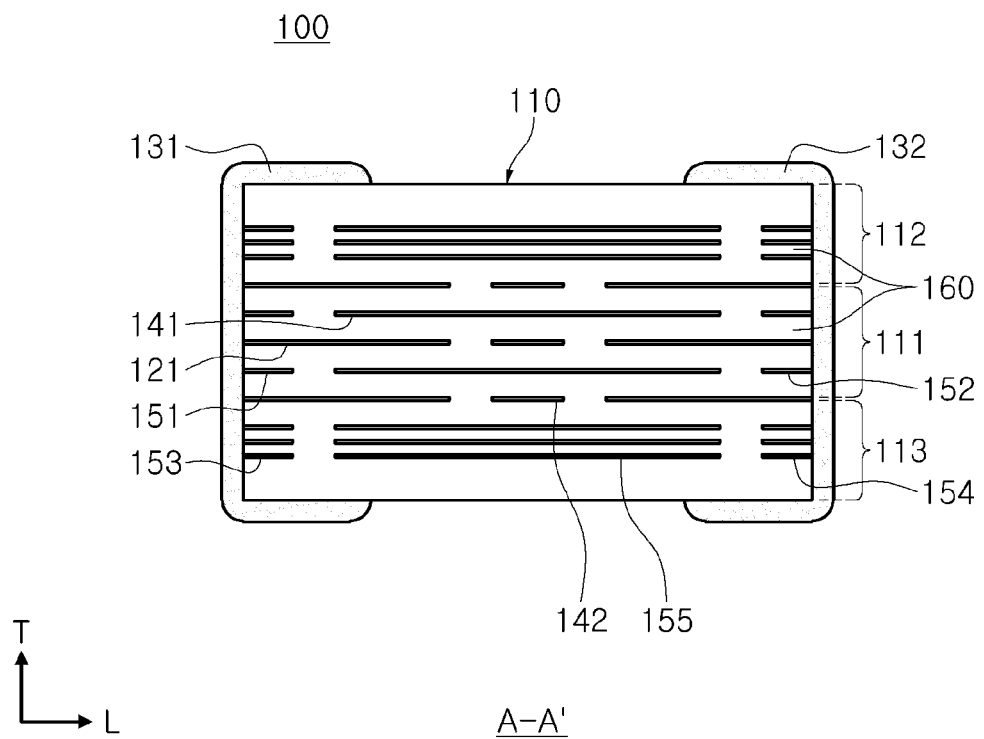
FIGS. 2 and 3 are cross-sectional views of the multilayer ceramic electronic component taken along line A-A' of FIG. 1.
Figure 3:
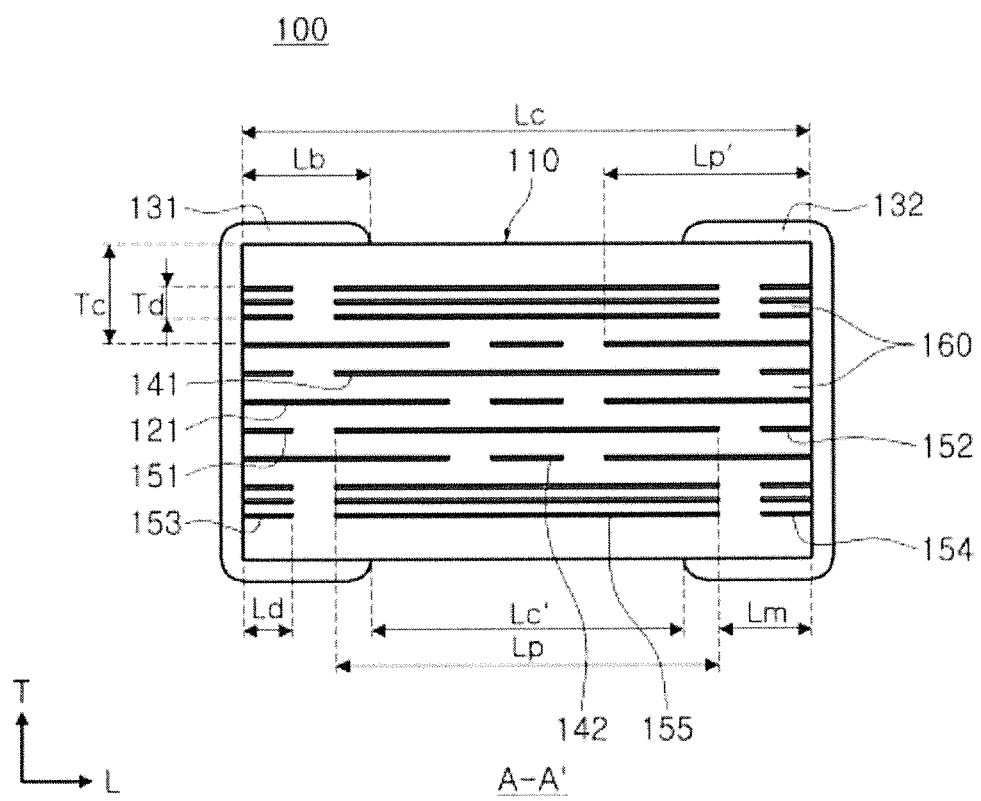

FIG. 1 is a perspective view of a multilayer ceramic electronic component 100 according to an exemplary embodiment of the present inventive concept; and FIGS. 2 and 3 are cross-sectional views of the multilayer ceramic electronic component 100, taken along line A-A' of FIG. 1.

Referring to FIGS. 1 through 3, the multilayer ceramic electronic component 100 according to the exemplary embodiment of the present inventive concept may include: a ceramic body 110 including dielectric layers 160; an active layer 111 including first and second internal electrodes 121 and 122 disposed in the ceramic body 110 to be exposed to both end surfaces of the ceramic body 110 in the length direction of the ceramic body 110, respectively, first floating electrodes 141 each disposed alternatingly with the first and second internal electrodes 121 and 122 in the thickness direction of the ceramic body 110 and each having both end portions overlapping end portions of the respective first and second internal electrodes 121 and 122 while being spaced apart from each other in the thickness direction of the ceramic body 110, second floating electrodes 142 each disposed to be spaced apart from the first and second internal electrodes 121 and 122, and first and second dummy electrodes 151 and 152 disposed to be spaced apart from the first floating electrode 141 and exposed to both end surfaces of the ceramic body 110 in the length direction of the ceramic body 110, respectively; upper and lower cover layers 112 and 113 disposed upwardly and downwardly of the active layer 111, respectively; third and fourth dummy electrodes 153 and 154 disposed in the upper cover layer 112 to be exposed to both end surfaces of the ceramic body 110 in the length direction of the ceramic body 110, respectively, and disposed in the lower cover layer 113 to be exposed to both end surfaces of the ceramic body 110 in the length direction of the ceramic body 110, respectively; fifth dummy electrodes 155 disposed in the upper and lower cover layers 112 and 113 to be spaced apart from the third and fourth dummy electrodes 153 and 154; and first and second external electrodes 131 and 132 disposed in both end surfaces of the ceramic body 110 in the length direction the ceramic body 110 and electrically connected to the first and second internal electrodes 121 and 122, respectively.

The first and second internal electrodes 121 and 122 and the second floating electrode 142 may be disposed on a common dielectric layer 160 to be spaced apart from one another, the first floating electrode 141 and the first and second dummy electrodes 151 and 152 may be disposed on a common dielectric layer 160 to be spaced apart from one another, and the third to fifth dummy electrodes 153 to 155 may be disposed on a common dielectric layer 160 to be spaced apart from one another. A manufacturing process of the multilayer ceramic electronic component 100 may be simplified by disposing the electrodes as described above.

Referring to FIG. 2, in terms of a functional classification of the multilayer ceramic electronic component 100, the multilayer ceramic electronic component 100 may include the active layer 111 in which the first and second internal electrodes 121 and 122, the first and second floating electrodes 141 and 142, the first and second dummy electrodes 151 and 152, and the dielectric layers 160 are stacked, the upper cover layer 112 in which the third to fifth dummy electrode 153 to 155 and the dielectric layers 160 are stacked upwardly of the active layer 111, and the lower cover layer 113 in which the third to fifth dummy electrode 153 to 155 and the dielectric layers 160 are stacked downwardly of the active layer 111. In the active layer 111, as current flows in the first and second internal electrodes 121 and 122, capacitance may be formed by the first and second internal electrodes 121 and 122 and the first and second floating electrodes 141 and 142.

The ceramic body 110 may be formed by stacking the plurality of dielectric layers 160 in the thickness direction of the ceramic body 110 and then sintering the stacked dielectric layers 160, and dielectric layers 160 adjacent to one another may be integrated to be difficult to discern a boundary therebetween. Here, the ceramic body 110 may have a parallelepipedal shape.

The dielectric layer 160 may contain ceramic powder particles having a high-k, for example, barium titanate ($BaTiO_3$) based ceramic powder particles, but the type of powder particles contained in the dielectric layer is not limited thereto as long as the sufficient capacitance thereof may be obtained.

In addition, the dielectric layer 160 may further contain various ceramic additives such as transition metal oxides or carbides, a rare earth element, magnesium (Mg), aluminum (Al), or the like, an organic solvent, a plasticizer, a binder, a dispersant, and the like, in addition to the aforementioned ceramic powder particles, as necessary.

The upper and lower cover layers 112 and 113 may be formed by sintering a plurality of ceramic sheets similarly to the dielectric layer 160 including the first and second internal electrodes 121 and 122 formed thereon, and may have a similar structure to that of the dielectric layers 160 positioned centrally of the ceramic body 110.

The first and second external electrodes 131 and 132 may be formed on both end surfaces of the ceramic body 110 in the length direction of the ceramic body 110, respectively, to encapsulate the plurality of first and second internal electrodes 121 and 122 exposed to both end surfaces of the ceramic body 110 in the length direction of the ceramic body 110 to thereby be electrically connected to the first and second internal electrodes 121 and 122, respectively.

The first and second external electrodes 131 and 132 as described above may be formed of a conductive metal, for example, at least one of silver (Ag), lead (Pb), platinum (Pt), nickel (Ni), copper (Cu), an alloy thereof, or the like, but the type of material forming the first and second external electrodes 131 and 132 is not limited thereto.

Meanwhile, first and second plating layers (not illustrated) may be formed on the first and second external electrodes 131 and 132, as necessary.

The first and second plating layers may include Ni plating layers formed on the first and second external electrodes 131 and 132 and tin (Sn) plating layers formed on the Ni plating layers.

The first and second plating layers as described above may be provided in order to increase adhesion strength between the multilayer ceramic electronic component 100 and a printed circuit board (PCB) 210 at the time of mounting the multilayer ceramic electronic component 100 on the PCB 210, or the like, using solders 230, or the like. A plating process may be performed by a scheme known in the art, and a lead-free plating process may be performed by way of example in consideration of eco-friendly factors, but the type of plating process is not limited thereto.

The first and second internal electrodes 121 and 122, which are electrodes having different polarities, may be simultaneously formed to be spaced apart from each other on the ceramic sheet forming the dielectric layer 160, and may be formed in the ceramic body 110 to be exposed to both end surfaces of the ceramic body 110 in the length direction of the ceramic body 110, respectively.

As described above, the first and second internal electrodes 121 and 122 exposed to both end surfaces of the ceramic body 110 in the length direction of the ceramic body 110, respectively, may be electrically connected to the first and second external electrodes 131 and 132, respectively.

In addition, the first and second internal electrodes 121 and 122 may be formed of a conductive metal, for example, at least one of Ag, Pb, Pt, Ni, Cu, an alloy thereof, or the like, but the type of material forming the first and second internal electrodes 121 and 122 is not limited thereto.

Generally, in a case of a high capacitance multilayer ceramic capacitor, the capacitance value thereof may be adjusted by increasing or decreasing the number of stacked internal electrodes, but in a case of a low capacitance multilayer ceramic capacitor, the capacitance value thereof may be decreased by inserting a buffer layer having a predetermined thickness between the dielectric layers 160 to increase a thickness of one of the layers forming the dielectric layers 160. Since in a low capacitance multilayer ceramic capacitor, the number of stacked dielectric layers and internal electrodes of an active layer 111 is relatively small, securing the sufficient bending strength of the ceramic capacitor may be difficult, such that cracks, delaminations, or the like, may be generated during a manufacturing process thereof.

According to the exemplary embodiment of the present inventive concept, the floating electrodes and the dummy electrodes may be included, such that a step difference between a central portion of the ceramic body 110 and both distal ends of the ceramic body 110 may be significantly decreased, and accordingly, the bending strength of the multilayer ceramic electronic component 100 may be improved.

Based on the length direction of the ceramic body 110, the first floating electrode 141 and the fifth dummy electrode 155 may have the same length as each other, the first and third dummy electrodes 151 and 153 may have the same length as each other, and the second and fourth dummy electrodes 152 and 154 may have the same length as each other. In this case, based on the thickness direction of the ceramic body 110, the first floating electrode 141 and the fifth dummy electrode 155 may be disposed to overlap each other, and the entirety of the first floating electrode 141 and the entirety of the fifth dummy electrode 155 may overlap each other. Similarly, the first and third dummy electrodes 151 and 153 may be disposed to overlap each other, and the entirety of the first dummy electrode 151 and the entirety of the third dummy electrode 153 may overlap each other. In addition, the second and fourth dummy electrodes 152 and 154 may be disposed to overlap each other, and the entirety of the second dummy electrode 152 and the entirety of the fourth dummy electrode 154 may overlap each other. The disposition of the first to fifth dummy electrodes 151 to 155 as described above may be advantageous for significantly decreasing the step difference in the ceramic body 110.

The first floating electrodes 141 may each be disposed alternatingly with the first and second internal electrodes 121 and 122 in the active layer 111 of the ceramic body 110 in the thickness direction of the ceramic body 110, and both end portions of each of the first floating electrodes 141 overlap one end portions of the respective first and second internal electrodes 121 and 122, by predetermined lengths, spaced apart from each other, respectively.

The first floating electrodes 141 may be formed in the ceramic body 110 not to be exposed outwardly of the ceramic body 110, and may be electrically separated from the first and second external electrodes 131 and 132.

A width of the first floating electrode 141 may be the same as that of the first or second internal electrode 121 or 122, but the present inventive concept is not limited thereto.

The second floating electrode 142 may be formed on the dielectric layer 160 on which the first and second internal electrodes 121 and 122 are formed in the active layer 111 of the ceramic body 110. The second floating electrode 142 may be formed between the first and second internal electrodes 121 and 122, and may be electrically separated from the first and second internal electrodes 121 and 122 and the first and second external electrodes 131 and 132. Based on the thickness direction of the ceramic body 110, the first and second floating electrodes 141 and 142 may be alternatingly stacked with each of the dielectric layers 160 interposed therebetween. In addition, the first and second floating electrodes 141 and 142 may overlap each other.

A width of the second floating electrode 142 may be the same as that of the first internal electrode 121, the second internal electrode 122, or the first floating electrode 141, but the present inventive concept is not limited thereto.

Capacitance of the multilayer ceramic electronic component 100 may be adjusted by adjusting the number and shape of first and second floating electrodes 141 and 142, and first and second internal electrodes 121 and 122. Therefore, the shape, the area of overlapping portion, and the number of the first and second floating electrodes 141 and 142 and first and second internal electrodes 121 and 122 may be variously modified in order to adjust capacitance, and are not limited to the exemplary embodiment illustrated in FIGS. 1 through 3.

In addition, the first and second floating electrodes 141 and 142 may be formed of a conductive metal, for example, at least one of Ag, Pb, Pt, Ni, Cu, an alloy thereof, or the like, but the present inventive concept is not limited thereto.

The first and second dummy electrodes 151 and 152 may be formed on the dielectric layer 160 on which the first floating electrode 141 is formed, and may be disposed to be spaced apart from the first floating electrode 141. The first and second dummy electrodes 151 and 152 may be exposed to both end surfaces of the ceramic body 110 in the length direction of the ceramic body 110, respectively. The exposed first and second dummy electrodes 151 and 152 may be connected to the first and second external electrodes 131 and 132, respectively.

The third to fifth dummy electrodes 153 to 155 may be formed on the dielectric layers 160 of the upper and lower cover layers 112 and 113. The third and fourth dummy electrodes 153 and 154 may be spaced apart from each other, may be exposed to both end surfaces of the ceramic body 110 in the length direction of the ceramic body 110, respectively, and may be connected to the first and second external electrodes 131 and 132, respectively. The fifth dummy electrode 155 may be formed on the dielectric layer 160 on which the third and fourth dummy electrodes 153 and 154 are formed, and may be spaced apart from the third and fourth dummy electrodes 153 and 154. The fifth dummy electrode 155 may be formed in the ceramic body 110 not to be exposed outwardly of the ceramic body 110, and may be electrically separated from the first and second external electrodes 131 and 132.

The first to fifth dummy electrodes 151 to 155 may serve to significantly decrease the step difference between the central portion of the ceramic body 110 and both distal ends of the ceramic body 110 based on the end surfaces of the ceramic body 110 in the length directions of the ceramic body 110. Therefore, the fifth dummy electrode 155 may have the same shape as that of the first floating electrode 141, and a width of each of the first to fifth dummy electrodes 151 to 155 may be the same as that of each of the first and second floating electrodes 141 and 142. Based on the end surfaces of the ceramic body 110 in the length and width directions of the ceramic body 110, an area of the dielectric layer 160 occupied by the first floating electrode 141 in the dielectric layer 160 may be the same as an area of the dielectric layer 160 occupied by the fifth dummy electrode 155 in the dielectric layer 160, and areas of the dielectric layer 160 occupied by the first and second dummy electrodes 151 and 152 in the dielectric layer 160 may be the same as areas of the dielectric layer 160 occupied by the third and fourth dummy electrodes 153 and 154 in the dielectric layer 160, respectively. The step difference in the ceramic body 110 may be significantly decreased by the above-mentioned disposition of the electrodes.

When a length of the ceramic body 110 is defined as Lc, a distance between the first floating electrode 141 and each end surface of the ceramic body 110 based on the length direction of the ceramic body 110 is defined as Lm, and a length of each of the first and second dummy electrodes 151 and 152 based on the length direction of the ceramic body 110 is defined as Ld, the multilayer ceramic electronic component 100 according to the exemplary embodiment of the present inventive concept may satisfy $0.01 \times Lc < Lm - Ld$.

The first floating electrode 141 may need to be electrically separated from the first and second external electrodes 131 and 132, and may also need to be electrically separated from the first and second dummy electrodes 151 and 152 disposed on the same dielectric layer 160. Therefore, the first floating electrode 141 may be disposed to be spaced apart from the first and second dummy electrodes 151 and 152. A distance between the first floating electrode 141 and each of the first and second dummy electrodes 151 and 152, that is, a difference between the length Lm and the length Ld, may be 0.01 times greater than the length Lc of the ceramic body 110, and accordingly, an electric connection between the first floating electrode 141 and the first or second dummy electrodes 151 or 152 may be prevented in a stable manner.

Referring to FIGS. 1 through 3, the first and second external electrodes 131 and 132 may be extended onto upper and lower surfaces of the ceramic body 110. Since the first and second external electrodes 131 and 132 are formed to be electrically separated from each other on the upper and lower surfaces, the first and second external electrodes 131 and 132 may be formed to be spaced apart from each other by a predetermined distance.

When a distance between the first and second external electrodes 131 and 132 on the upper and lower surfaces of the ceramic body 110 is defined as Lc' and a length of the fifth dummy electrode 155 based on the length direction of the ceramic body 110 is defined as Lp, the multilayer ceramic electronic component 100 according to the exemplary embodiment of the present inventive concept may satisfy Lc'<Lp. When the length Lp of the fifth dummy electrode 155 is greater than the distance Lc' between the first and second external electrodes 131 and 132, the step difference between the central portion of the ceramic body 110 and both distal ends of the ceramic body 110 may be thoroughly removed, and the bending strength of multilayer ceramic electronic component 100 may be improved.

When the length Lp of the fifth dummy electrode 155 is 1.1 times less than the distance Lc' between the first and second external electrodes 131 and 132, since the fifth dummy electrode 155 may not sufficiently support the ceramic body 110, the bending strength of multilayer ceramic electronic component 100 may be decreased, such that cracks or delaminations may be generated. When the length Lp of the fifth dummy electrode 155 is 0.95 times greater than the length of the ceramic body 110, since the fifth dummy electrode 155 may support a considerably large portion of the ceramic body 110, a step difference reduction effect may be minimal, and the fifth dummy electrode 155 may be connected to the first and second external electrodes 131 and 132, such that the desired capacitance thereof may not be obtained. Therefore, when the length of the ceramic body 110 is defined as Lc, the sufficient bending strength of the multilayer ceramic electronic component 100 may be obtained therein in a case in which the length Lp of the fifth dummy electrode 155 satisfies $1.1 \times Lc' \le Lp < 0.95 \times Lc$.

Based on the length direction of the ceramic body 110, when the distance between the first floating electrode 141 and the end surface of the ceramic body 110 is defined as Lm, and a length of a portion of the first external electrode 131 extended onto the upper or lower surface of the ceramic body 110 and a length of a portion of the second external electrode 132 extended onto the upper or lower surface of the ceramic body 110 are each defined as Lb, the multilayer ceramic electronic component 100 according to the exemplary embodiment of the present inventive concept may satisfy Lm<Lb.

The first floating electrode 141 may have the same shape as that of the fifth dummy electrode 155. In this case, the distance between the first floating electrode 141 and each end surface of the ceramic body 110 may be equal to a distance between the fifth dummy electrode 155 and each end surface of the ceramic body 110. Since the fifth dummy electrode 155 is formed in the ceramic body 110 not to come in contact with the third and fourth dummy electrodes 153 and 154, the fifth dummy electrode 155 may be formed to be spaced apart from both end surfaces of the ceramic body 110 in the length direction of the ceramic body 110 and spaced apart from the third and fourth dummy electrodes 153 and 154 by predetermined distances.

The first and second external electrodes 131 and 132 may be extended onto the upper and lower surfaces of the ceramic body 110. In this case, a distance from a distal end of a portion of the first external electrode 131 extended onto the upper or lower surface to one end surface of the ceramic body 110 and a distance from a distal end of a portion of the second external electrode 132 extended onto the upper or lower surface to the other end surface of the ceramic body 110 may each be defined as Lb.

When the distance Lm between the fifth dummy electrode 155 and each end surface of the ceramic body 110 is shorter than each of the distance Lb of the portion of the first external electrode 131 extended onto the upper or lower surface of the ceramic body 110 and the distance Lb of the portion of the second external electrode 132 extended onto the upper or lower surface of the ceramic body 110, the fifth dummy electrode 155 may sufficiently support portions of the ceramic body 110 onto which the first and second external electrodes 131 and 132 are extended, such that the bending strength of the multilayer ceramic electronic component 100 may be improved.

When the distance Lm between the fifth dummy electrode 155 and each end surface of the ceramic body 110 is 0.95 times greater than each of the distance Lb of the portion of the first external electrode 131 extended onto the upper or lower surface of the ceramic body 110 and the distance Lb of the portion of the second external electrode 132 extended onto the upper or lower surface of the ceramic body 110, since the fifth dummy electrode 155 may not sufficiently support the portions of the ceramic body 110 onto which the first and second external electrodes 131 and 132 are extended, the sufficient bending strength of the multilayer ceramic electronic component 100 may not be obtained, whereby cracks or delaminations may be generated. Therefore, the multilayer ceramic electronic component 100 having the improved bending strength may be obtained by satisfying Lm≤0.95×Lb.

Based on the length direction of the ceramic body 110, when a length of each of the first and second internal electrodes 121 and 122 is defined as Lp' and the length of the portion of the first external electrode 131 extended onto the upper or lower surface of the ceramic body 110 and the length of the portion of the second external electrode 132 extended onto the upper or lower surface of the ceramic body 110 are each defined as Lb, the multilayer ceramic electronic component 100 according to the exemplary embodiment of the present inventive concept may satisfy Lb<Lp'.

The first and second internal electrodes 121 and 122 may be spaced apart from each other while coming in contact with both end surfaces of the ceramic body 110 in the length direction of the ceramic body 110, respectively. The first and second internal electrodes 121 and 122 may be formed so that the length Lp' thereof is longer than each of the length Lb of the portion of the first external electrode 131 extended onto the upper or lower surface of the ceramic body 110 and the length Lb of the portion of the second external electrode 132 extended onto the upper or lower surface of the ceramic body 110, and accordingly, the step difference in the ceramic body 110 may be significantly decreased, whereby the bending strength of the multilayer ceramic electronic component 100 may be improved. In addition, areas of portions of the first and second internal electrodes 121 and 122 overlapping the first floating electrode 141 may be sufficiently secured, such that the desired capacitance thereof may be easily obtained.

When the length Lp' of each of the first and second internal electrodes 121 and 122 is 1.1 times less than each of the length Lb of the portion of the first external electrode 131 extended onto the upper or lower surface of the ceramic body 110 and the length Lb of the portion of the second external electrode 132 extended onto the upper or lower surface of the ceramic body 110, the sufficient bending strength of the multilayer ceramic electronic component 100 may not be obtained due to an increase in the step difference in the ceramic body 110, such that cracks or delaminations may be generated. Therefore, the multilayer ceramic electronic component 100 having the sufficient bending strength may be obtained by satisfying 1.1×Lb≤Lp'.

The upper and lower cover layers 112 and 113 may serve as a buffer absorbing external and internal impacts. The dummy electrodes formed in the upper and lower cover layers 112 and 113 may serve to decrease the step difference in the ceramic body 110 to prevent generation of cracks or delaminations. Therefore, a sufficient number of dummy electrodes may need to be formed.

When a distance between a lowermost dummy electrode and an uppermost dummy electrode among the third to fifth dummy electrodes 153 to 155 formed in the upper cover layer 112 is defined as Td, and a thickness of the upper cover layer 112 is defined as Tc, the multilayer ceramic electronic component 100 according to the exemplary embodiment of the present inventive concept may satisfy 0.1×Tc≤Td≤0.99×Tc. Similarly, when a distance between a lowermost dummy electrode and an uppermost dummy electrode among the third to fifth dummy electrodes 153 to 155 formed in the lower cover layer 113 is defined as Td, and a thickness of the lower cover layer 113 is defined as Tc, the multilayer ceramic electronic component 100 according to the exemplary embodiment of the present inventive concept may satisfy 0.1×Tc≤Td≤0.99×Tc.

When the thickness Td of a layer including the third to fifth dummy electrodes 153 to 155 is 0.1 times less than the thickness Tc of the upper or lower cover layer 112 or 113, since the number of dummy electrodes is negligible, the step difference in the ceramic body 110 may not be removed, and thus the bending strength of the multilayer ceramic electronic component 100 may be decreased. When the thickness Td of the layer including the third to fifth dummy electrodes 153 to 155 is 0.99 times greater than the thickness Tc of the upper or lower cover layer 112 or 113, the third to fifth dummy electrodes 153 to 155 may come in contact with the portions of the first and second external electrodes 131 and 132 extended onto the upper and lower surfaces of the ceramic body 110. Therefore, the multilayer ceramic electronic component 100 having the sufficient bending strength may be obtained by satisfying 0.1×Tc≤Td≤0.99×Tc.

In the case in which a large number of the third to fifth dummy electrodes 153 to 155 are stacked or a thickness of the dielectric layer 160 disposed between the third to fifth dummy electrodes 153 to 155 is excessively great, a size of a chip, for example, the multilayer ceramic electronic component 100, may be considerably increased.

Therefore, the thickness of the dielectric layer 160 disposed between the third to fifth dummy electrodes 153 to 155 may need to be minimized within a degree in which an occurrence of the step difference may be suppressed. According to the exemplary embodiment of the present inventive concept, the dielectric layer 160 disposed between the third to fifth dummy electrodes 153 to 155 may have a thickness corresponding to about 10 to 20% of a thickness of the dielectric layer 160 disposed between the first and second internal electrodes 121 and 122. More particularly, the dielectric layer 160 disposed between the third to fifth dummy electrodes 153 to 155 may have a thickness of 5 micrometers (μm), and the dielectric layer 160 disposed between the first and second internal electrodes 121 and 122 may have a thickness of 30 μm.

Board Having Multilayer Ceramic Electronic Component

Figure 4:
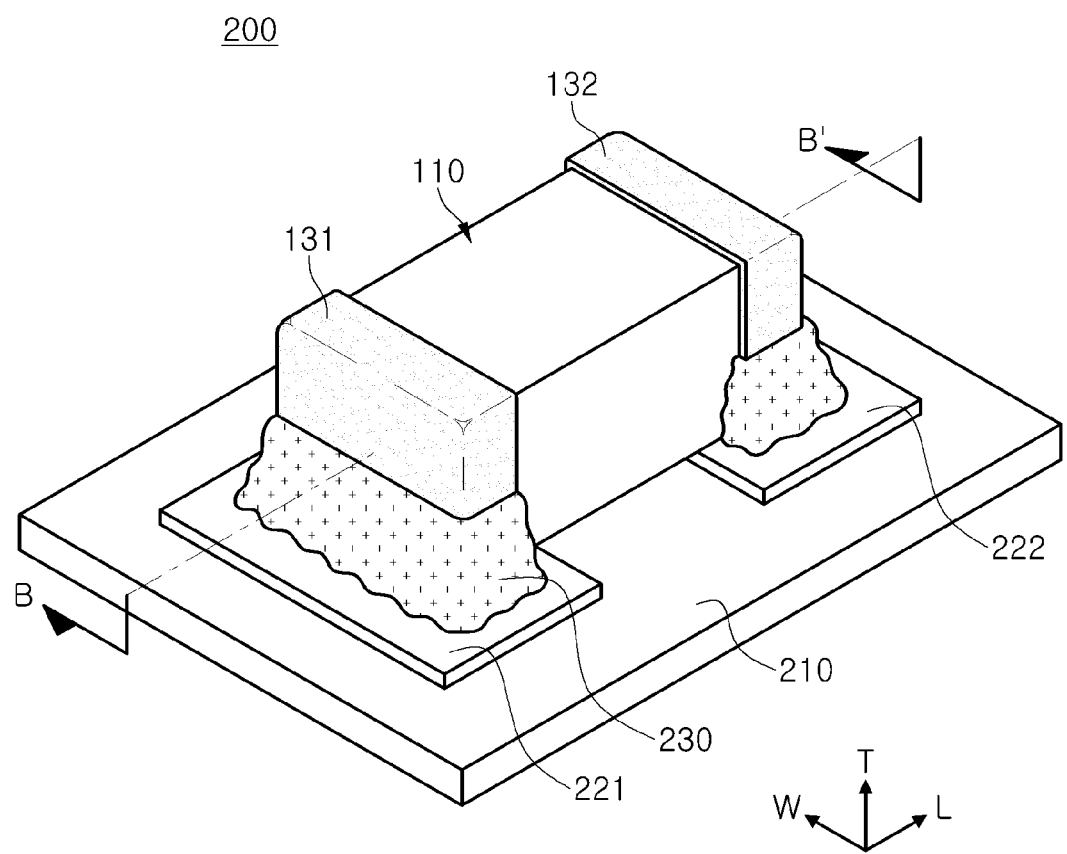
FIG. 4 is a perspective view of a board having a multilayer ceramic electronic component according to an exemplary embodiment of the present inventive concept.
Figure 5:
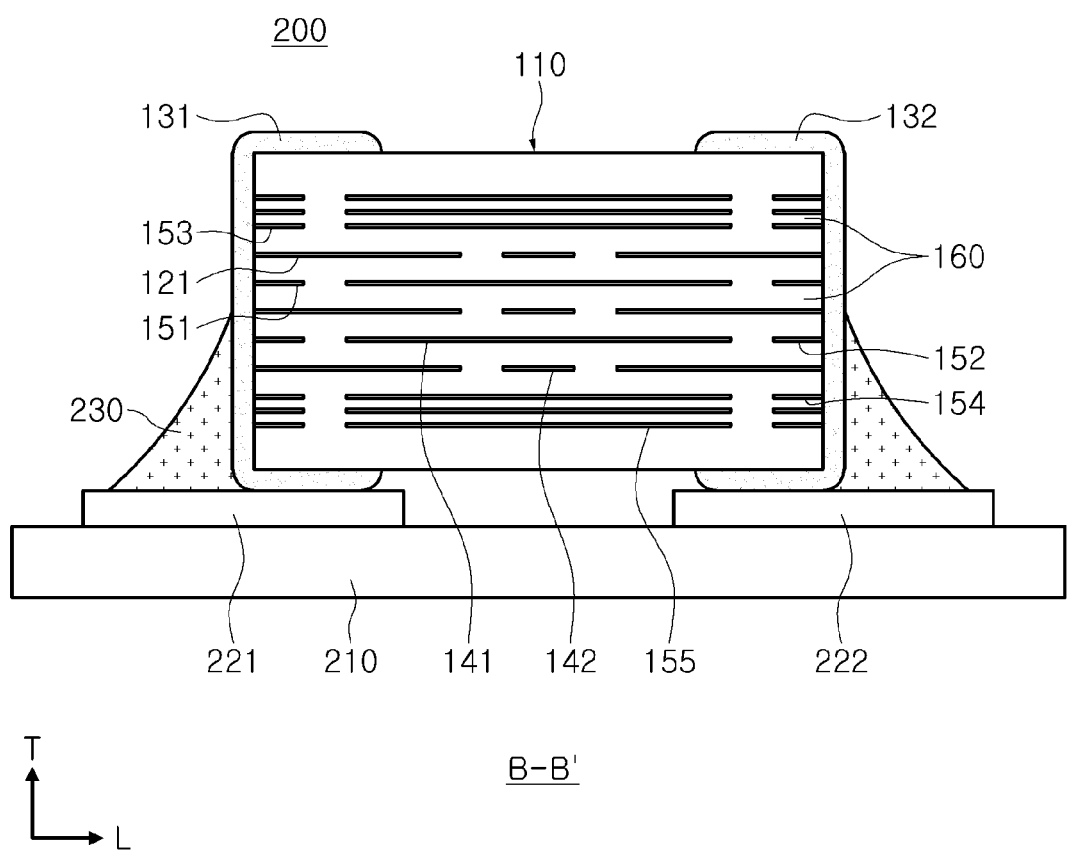
FIG. 5 is a cross-sectional view of the board having a multilayer ceramic electronic component, taken along line B-B' of FIG. 4.

FIG. 4 is a perspective view of a board 200 having a multilayer ceramic electronic component according to an exemplary embodiment of the present inventive concept; and FIG. 5 is a cross-sectional view of the board 200 having the multilayer ceramic electronic component, taken along line B-B' of FIG. 4.

Referring to FIGS. 4 and 5, the board 200 having the multilayer ceramic electronic component according to the exemplary embodiment of the present inventive concept may include a PCB 210, first and second board electrodes 221 and 222 disposed on a surface of the PCB 210, and the multilayer ceramic electronic component 100 mounted on the PCB 210 and electrically connected to the first and second board electrodes 221 and 222. The multilayer ceramic electronic component 100 may include: a ceramic body 110 including dielectric layers 160; an active layer 111 including first and second internal electrodes 121 and 122 disposed in the ceramic body 110 to be exposed to both end surfaces of the ceramic body 110 in the length direction of the ceramic body 110, respectively, first floating electrodes 141 each disposed alternatingly with the first and second internal electrodes 121 and 122 in the thickness direction of the ceramic body 110 and each having both end portions overlapping end portions of the respective first and second internal electrodes while being spaced apart from each other in the thickness direction of the ceramic body 110, second floating electrodes 142 each disposed to be spaced apart from the first and second internal electrodes 121 and 122, and first and second dummy electrodes 151 and 152 disposed to be spaced apart from the first floating electrode 141 and exposed to both end surfaces of the ceramic body 110 in the length direction of the ceramic body, respectively; upper and lower cover layers 112 and 113 disposed upwardly and downwardly of the active layer 111, respectively; third and fourth dummy electrodes 153 and 154 disposed in the upper cover layer 112 to be exposed to both end surfaces of the ceramic body 110 in the length direction of the ceramic body 110, respectively, and disposed in the lower cover layer to be exposed to both end surfaces of the ceramic body in the length direction of the ceramic body 110, respectively; fifth dummy electrodes 155 disposed in the upper and lower cover layers 112 and 113 to be spaced apart from the third and fourth dummy electrodes 153 and 154; and first and second external electrodes 131 and 132 disposed in both end surfaces of the ceramic body 110 in the length direction of the ceramic body 110 and electrically connected to the first and second internal electrodes 121 and 122, respectively.

The multilayer ceramic electronic component 100 may be electrically connected to the PCB 210 by solders 230 in a state in which the lower cover layer 113 is disposed within the multilayer ceramic electronic component 100 in a lower portion of the multilayer ceramic electronic component 100, and the first and second external electrodes 131 and 132 are positioned on the first and second board electrodes 221 and 222 to come in contact with each other, respectively.

The multilayer ceramic electronic component 100 mounted on the board 200 having the multilayer ceramic electronic component according to the exemplary embodiment of the present inventive concept may be the same as the multilayer ceramic electronic component 100 according to the above-mentioned exemplary embodiment.

As set forth above, according to exemplary embodiments of the present inventive concept, the multilayer ceramic electronic component having relatively high bending strength and the board having the multilayer ceramic electronic component may be provided, such that cracks and delaminations may be prevented.

While exemplary embodiments have been shown and described above, it will be apparent to those skilled in the art that modifications and variations could be made without departing from the scope of the invention as defined by the appended claims.

What is claimed is:

1. A multilayer ceramic electronic component comprising:
a ceramic body including dielectric layers;
an active layer including first and second internal electrodes disposed in the ceramic body to be exposed to both end surfaces of the ceramic body in a length direction of the ceramic body, respectively, first floating electrodes each disposed alternatingly with the first and second internal electrodes in a thickness direction of the ceramic body and each having both end portions overlapping end portions of the respective first and second internal electrodes while being spaced apart from each other in the thickness direction of the ceramic body, second floating electrodes each disposed to be spaced apart from the first and second internal electrodes, and first and second dummy electrodes disposed to be spaced apart from the first floating electrodes and exposed to both end surfaces of the ceramic body in the length direction of the ceramic body, respectively;
upper and lower cover layers disposed upwardly and downwardly of the active layer, respectively;
third and fourth dummy electrodes disposed in the upper cover layer to be exposed to both end surfaces of the ceramic body in the length direction of the ceramic body, respectively, and disposed in the lower cover layer to be exposed to both end surfaces of the ceramic body in the length direction of the ceramic body, respectively;
fifth dummy electrodes disposed in the upper and lower cover layers to be spaced apart from the third and fourth dummy electrodes; and
first and second external electrodes disposed in both end surfaces of the ceramic body in the length direction of the ceramic body, and electrically connected to the first and second internal electrodes, respectively,
wherein the first and second external electrodes are extended onto upper and lower surfaces of the ceramic body, and
wherein, based on the length direction of the ceramic body, a distance between the first and second external electrodes on the upper and lower surfaces is defined as Lc' and a length of the fifth dummy electrode is defined as Lp, Lc'<Lp is satisfied,
wherein, based on the length direction of the ceramic body, a length of each of the first and second internal electrodes is defined as Lp', and a length of a portion of the first external electrode extended onto the upper or lower surface of the ceramic body and a length of a portion of the second external electrode extended onto the upper or lower surface of the ceramic body are each defined as Lb, Lb<Lp' is satisfied.

2. The multilayer ceramic electronic component of claim 1, wherein the first and second internal electrodes and the second floating electrode are disposed on a common dielectric layer, the first floating electrode and the first and second dummy electrodes are disposed on a common dielectric layer, and the third to fifth dummy electrodes are disposed on a common dielectric layer.

3. The multilayer ceramic electronic component of claim 1, wherein based on the length direction of the ceramic body, the first floating electrode and the fifth dummy electrode have the same length as each other, the first and third dummy electrodes have the same length as each other, and the second and fourth dummy electrodes have the same length as each other.

4. The multilayer ceramic electronic component of claim 1, wherein an area of the dielectric layer occupied by the first floating electrode in the dielectric layer is the same as an area of the dielectric layer occupied by the fifth dummy electrode in the dielectric layer, and areas of the dielectric layer occupied by the first and second dummy electrodes in the dielectric layer are the same as areas of the dielectric layer occupied by the third and fourth dummy electrodes in the dielectric layer, respectively.

5. The multilayer ceramic electronic component of claim 1, wherein a thickness of the upper or lower cover layer is defined as Tc, and a distance between a lowermost dummy electrode and an uppermost dummy electrode among the third to fifth dummy electrodes disposed in the upper or lower cover layer is defined as Td, $0.1 \times Tc \leq Td \leq 0.99 \times Tc$ is satisfied.

6. The multilayer ceramic electronic component of claim 1, wherein a length of the ceramic body is defined as Lc, and based on the length direction of the ceramic body, a distance between the first floating electrode and each end surface of the ceramic body is defined as Lm and a length of each of the first and second dummy electrodes is defined as Ld, $0.01 \times Lc < Lm - Ld$ is satisfied.

7. The multilayer ceramic electronic component of claim 1, wherein a length of the ceramic body is defined as Lc, and $1.1 \times Lc' \leq Lp < 0.95 \times Lc$ is satisfied.

8. The multilayer ceramic electronic component of claim 1, wherein based on the length direction of the ceramic body, a distance between the first floating electrode and each end surface of the ceramic body is defined as Lm, and a length of a portion of the first external electrode extended onto the upper or lower surface of the ceramic body and a length of a portion of the second external electrode extended onto the upper or lower surface of the ceramic body are each defined as Lb, $Lm < Lb$ is satisfied.

9. The multilayer ceramic electronic component of claim 8, wherein $Lm \leq 0.95 \times Lb$ is satisfied.

10. The multilayer ceramic electronic component of claim 1, wherein $1.1 \times Lb \leq Lp'$ is satisfied.

11. The multilayer ceramic electronic component of claim 1, wherein a thickness of the dielectric layer disposed between the fifth dummy electrodes is less than a thickness of the dielectric layer disposed between the first internal electrodes or a thickness of the dielectric layer disposed between the second internal electrodes.

12. The multilayer ceramic electronic component of claim 11, wherein the thickness of the dielectric layer disposed between the fifth dummy electrodes is 5 micrometers (μm), the thickness of the dielectric layer disposed between the first internal electrodes is 30 μm, and the thickness of the dielectric layer disposed between the second internal electrodes is 30 μm.

13. A board having a multilayer ceramic electronic component, the board comprising:
a printed circuit board (PCB);
first and second board electrodes disposed on a surface of the PCB; and
a multilayer ceramic electronic component mounted on the PCB and electrically connected to the first and second board electrodes,
wherein the multilayer ceramic electronic component includes: a ceramic body including dielectric layers; an active layer including first and second internal electrodes disposed in the ceramic body to be exposed to both end surfaces of the ceramic body in a length direction of the ceramic body, respectively, first floating electrodes each disposed alternatingly with the first and second internal electrodes in a thickness direction of the ceramic body and each having both end portions overlapping end portions of the respective first and second internal electrodes while being spaced apart from each other in the thickness direction of the ceramic body, second floating electrodes each disposed to be spaced apart from the first and second internal electrodes, and first and second dummy electrodes disposed to be spaced apart from the first floating electrodes and exposed to both end surfaces of the ceramic body in the length direction of the ceramic body, respectively; upper and lower cover layers disposed upwardly and downwardly of the active layer, respectively; third and fourth dummy electrodes disposed in the upper cover layer to be exposed to both end surfaces of the ceramic body in the length direction of the ceramic body, respectively, and disposed in the lower cover layer to be exposed to both end surfaces of the ceramic body in the length direction of the ceramic body, respectively; fifth dummy electrodes disposed in the upper and lower cover layers to be spaced apart from the third and fourth dummy electrodes; and first and second external electrodes disposed in both end surfaces of the ceramic body in the length direction of the ceramic body, and electrically connected to the first and second internal electrodes, respectively,
wherein the first and second external electrodes are extended onto upper and lower surfaces of the ceramic body, and
wherein, based on the length direction of the ceramic body, a distance between the first and second external electrodes on the upper and lower surfaces is defined as Le' and a length of the fifth dummy electrode is defined as Lp, $Lc' < Lp$ is satisfied,
wherein, based on the length direction of the ceramic body, a length of each of the first and second internal electrodes is defined as Lp', and a length of a portion of the first external electrode extended onto the upper or lower surface of the ceramic body and a length of a portion of the second external electrode extended onto the upper or lower surface of the ceramic body are each defined as Lb, $Lb < Lp'$ is satisfied.

14. The board of claim 13, wherein a thickness of the upper or lower cover layer is defined as Tc, and a distance between a lowermost dummy electrode and an uppermost dummy electrode among the third to fifth dummy electrodes disposed in the upper or lower cover layer is defined as Td, $0.1 \times Tc \leq Td \leq 0.99 \times Tc$ is satisfied.

15. The board of claim 13, wherein a length of the ceramic body is defined as Lc, and based on the length direction of the ceramic body, a distance between the first floating electrode and each end surface of the ceramic body is defined as Lm and a length of each of the first and second dummy electrodes is defined as Ld, $0.01 \times Lc < Lm - Ld$ is satisfied.

16. The board of claim 13, wherein based on the length direction of the ceramic body, a distance between the first floating electrode and each end surface of the ceramic body is defined as Lm, and a length of a portion of the first external electrode extended onto the upper or lower surface of the ceramic body and a length of a portion of the second external electrode extended onto the upper or lower surface of the ceramic body are each defined as Lb, $Lm < Lb$ is satisfied.

* * * * *